2,951,055

STABILIZATION OF ACRYLONITRILE COPOLYMERS

Lionel B. Luttinger, Stamford, Conn., assignor to American Cyanamid Company, New York, N.Y., a corporation of Maine No Drawing. Filed Jan. 30, 1959, Ser. No. 790,060

7 Claims. (Cl. 260—45.7)

This invention relates to acrylonitrile resin compositions and to methods for preventing or retarding their discoloration by heat. More specifically, this invention relates to the color stabilization of copolymers containing not more than 40% acrylonitrile and correspondingly at least 60% styrene or methylstyrene.

Acrylonitrile is a very versatile, readily reactive vinyl monomer and the polymer thereof has many highly advantageous properties, such as resistance to heat and chemicals, particularly acids, low moisture absorption and high strength. Disadvantages of polyacrylonitrile are its difficulty in molding due to the poor flow properties of this polymer and its tendency to discolor. It is known that copolymers of acrylonitrile and vinyl aromatic compounds such as styrene and methylstyrene provide molding compositions which avoid the molding problem. Such copolymers have excellent flow and retain many of the excellent properties of acrylontrile. On the other hand, although acrylonitrile copolymers are generally regarded as having good thermal stability, they are subject to discoloration when heated to elevated temperatures. This discoloration occurs upon exposure to elevated temperatures either during polymerization, in the subsequent processing of the polymer or in the course of use of the product. Generally, the color deterioration results from working the polymer at high temperatures during the extrusion, molding and/or shaping of the polymer to the desired form.

It is an object of this invention to prevent or retard discoloration in polymer compositions. A more particular object pertains to the stabilization of acrylonitrile resin compositions against the effects of thermal discoloration by the addition of a small amount of a color stabilizer.

Specifically, the invention contemplates the color stabilization of copolymers of styrene-acrylonitrile and methylstyrene-acrylonitrile by incorporating therein small amounts of a heat stabilizing material selected from the group consisting of phosphorous acid-[2,2-bis(phenoxyphosphinooxymethyl)trimethylene] tetraphenyl ester (PBPT) and triisooctyl phosphite (TOP) in the polymeric compositions. These and other objects of my invention will be discussed more fully hereinbelow.

The polymers that may be stabilized in accordance with my invention include copolymers of acrylonitrile with styrene or methylstyrene containing between about 5% and 40% acrylonitrile and preferably about 10% to 35% by weight, the remainder being vinyl aromatic monomer.

The color stabilization of the polymeric compositions of my invention is effected by dispersing into said compositions a small amount of a color stabilizer selected from the group consisting of phosphorous acid-[2,2-bis(phenoxyphosphinooxymethyl)trimethylene] tetraphenyl ester, which is available under the trade name Pentite, and has the structure:

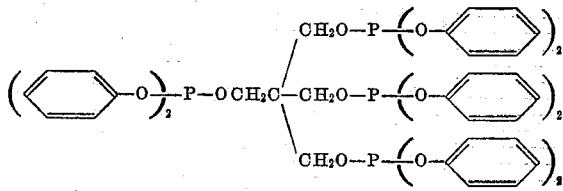

and triisooctyl phosphite having the structure:

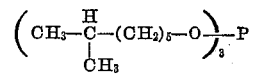

The amount of color stabilizer that is added to the polymers depends upon the proportion of combined acrylonitrile in the polymer and under the conditions under which the polymeric composition is to be processed. Generally, the quantity of color stabilizer suitable for most applications varies between about 0.001% to about 0.5% based on the weight of the combined acrylonitrile. Amounts of up to as high as about 2% or more may be introduced, although any benefit to be derived by use of such greater amount does not generally justify such larger quantities. The preferred amount in most instances is within the range of from about 0.005% to 0.3% based on the weight of combined acrylonitrile.

The particular stabilizers of the invention are not significantly volatilized upon heating and have a marked advantage in effecting stabilization over known compounds including other phosphorous compounds attempted for this purpose. The resistance against discoloration imparted to copolymers by these stabilizers is very pronounced, even after exposure to severe temperature conditions.

The color stabilizer may be incorporated into the polymer by any process that insures substantially thorough mixing. If desired, the stabilizer and the solid polymer may be mixed as, for example, on a two roll mill or by any other suitable, well-known and commercially available mixing devices adapted to blend solid plastic material. Alternatively, the stabilizer may be added to the monomers in the polymerization recipe when the polymerization is carried out as, for instance, in an aqueous emulsion. Other well-known methods that permit a uniform distribution of the color stabilizer throughout the polymer may also find use in my invention. Compositions produced according to the invention may also contain fillers, dyes or pigments, other stabilizers, waxes and other polymeric materials compatible with the acrylonitrile copolymer.

The polymers that have been color stabilized according to my invention may find use in the preparation of films and molded or extruded objects, particularly where a transparent or light pastel-colored article is desired.

In order that those skilled in the art may more fully understand the inventive concept herein employed, the following examples are set forth disclosing the improved resistance to discoloration of copolymers stabilized according to my invention.

The copolymers employed for Examples 1–11 are prepared according to the bulk polymerization procedure disclosed in U.S. Patent 2,745,824. The stabilizer is then introduced into the copolymer and the copolymer-stabilizer composition is milled for 20 minutes at 330° F., pressed into a sample 2 x 2 x ⅛" block and heated again at about 375° F. for one hour and then examined for percent yellowing by visible spectroscopy. The results are set forth in Table I.

Table I

| Example | Copolymer, Weight Ratio | Stabilizer | Weight Percent Based on Monomer | Percent Yellowing |
|---------|-------------------------|------------|---------------------------------|-------------------|
| 1 | 70/30 S/AN [1] | None | | 85.7 |
| 2 | 80/20 S/AN | None | | 80.5 |
| 3 | 70/30 S/AN | TOP [3] | 0.15 | 46.5 |
| 4 | 80/20 S/AN | TOP [3] | 0.1 | 47 |
| 5 | 70/30 S/AN | PBPT [4] | 0.003 | 44.7 |
| 6 | 70/30 S/AN | PBPT [4] | 0.02 | 58.5 |
| 7 | 70/30 S/AN | PBPT [4] | 0.1 | 49 |
| 8 | 80/20 S/AN | PBPT [4] | 0.005 | 50 |
| 9 | 70/30 MS/AN [2] | None | | 94 |
| 10 | 70/30 MS/AN | TOP | 0.05 | 47 |
| 11 | 70/30 MS/AN | PBPT | 0.05 | 45.5 |

[1] Styrene/acrylonitrile.
[2] Methylstyrene/acrylonitrile.
[3] Triisooctyl phosphite.
[4] Phosphorous acid - [2,2-bis(phenoxyphosphinooxymethyl)trimethylene] tetraphenyl ester.

Examples set forth in Table II below are prepared by introducing the stated amount of stabilizer into the monomer mixture and polymerizing the mixture by heating at 100° C. for 4 days and then at 130° C. in a sealed vessel under an atmosphere of nitrogen for 3 days. The percent yellowing in the copolymer is obtained by visible spectroscopy.

Table II

| Example | Copolymer, Weight Ratio | Stabilizer | Weight Percent Based on Monomer | Percent Yellowing |
|---------|-------------------------|------------|---------------------------------|-------------------|
| 12 | 70/30 S/AN [1] | None | | 88 |
| 13 | 80/20 S/AN | None | | 83 |
| 14 | 70/30 S/AN | TOP [3] | 0.1 | 50 |
| 15 | 80/20 S/AN | TOP [3] | 0.1 | 48 |
| 16 | 70/30 S/AN | TOP [3] | 0.05 | 49 |
| 17 | 70/30 S/AN | TOP [3] | 0.005 | 55 |
| 18 | 70/30 S/AN | TOP [3] | 0.15 | 63 |
| 19 | 70/30 S/AN | TOP [3] | 0.2 | 74 |
| 20 | 70/30 S/AN | PBPT [4] | 0.005 | 61 |
| 21 | 70/30 S/AN | PBPT [4] | 0.05 | 47 |
| 22 | 70/30 S/AN | PBPT [4] | 0.1 | 49 |
| 23 | 80/20 S/AN | PBPT [4] | 0.1 | 46 |
| 24 | 70/30 S/AN | PBPT [4] | 0.2 | 57 |
| 25 | 70/30 S/AN | Dibutyl hydrogen phosphite. | 0.1 | [5] 97 |
| 26 | 70/30 S/AN | Dimethyl phosphite. | 0.1 | [5] 86 |
| 27 | 70/30 S/AN | Trinitrophenyl phosphite. | 0.1 | [5] 80 |
| 28 | 70/30 S/AN | Hypophosphorous acid. | 0.1 | [5] 77 |
| 29 | 70/30 MS/AN [2] | None | | 94 |
| 30 | 80/20 MS/AN | None | | 87 |
| 31 | 70/30 MS/AN | TOP | 0.1 | [5] 49 |
| 32 | 70/30 MS/AN | PBPT | 0.1 | [5] 48 |
| 33 | 70/30 MS/AN | Dimethyl phosphite. | 0.1 | [5] 86 |
| 34 | 70/30 MS/AN | Trinitrophenyl phosphite. | 0.1 | [5] 79 |
| 35 | 70/30 MS/AN | Trimethyl hydrogen phosphite. | 0.1 | [5] 82 |

[1] Styrene/acrylonitrile.
[2] Methylstyrene/acrylonitrile.
[3] Triisooctyl phosphite.
[4] Phosphorous acid - [2,2-bis(phenoxyphosphinooxymethyl)trimethylene] tetraphenyl ester.
[5] Comparative examples.

It will be apparent to those skilled in the art that a variety of modifying ingredients and manipulative procedures may be employed in practicing the invention and that the invention does not exclude such modifications except as such are outside the spirit of the appended claims.

I claim:

1. A resinous composition having increased color stability which comprises the polymerization product of from about 5% to about 40% by weight of acrylonitrile and from about 95% to about 60% by weight of a compound selected from the group consisting of styrene and methylstyrene, and dispersed therein from about 0.002% to about 2% by weight based on the weight of the monomer of a compound selected from the group consisting of triisooctyl phosphite and phosphorous acid-[2,2-bis-(phenoxyphosphinooxymethyl)trimethylene] tetraphenyl ester.

2. A resinous composition having increased color stability which comprises the polymerization product of from about 5% to about 40% by weight of acrylonitrile and from about 95% to about 60% by weight of a compound selected from the group consisting of styrene and methylstyrene, and dispersed therein from about 0.001% to about 0.5% by weight based on the weight of the monomer of the compound phosphorous acid-[2,2-bis-(phenoxyphosphinooxymethyl)trimethylene] triphenyl ester.

3. A resinous composition having increased color stability which comprises the polymerization product of from about 5% to about 40% by weight of acrylonitrile and from about 95% to about 60% by weight of a compound selected from the group consisting of styrene and methylstyrene and dispersed therein from about 0.001% to about 0.5% by weight based on the weight of the monomer of the compound triisooctyl phosphite.

4. A resinous composition having increased color stability which comprises the polymerization product of from about 10% to about 35% by weight of acrylonitrile and from about 90% to about 65% by weight of styrene, and dispersed therein from about 0.005% to about 0.3% by weight based on the weight of the monomer of the color stabilizer phosphorous acid-[2,2-bis(phenoxyphosphinooxymethyl)trimethylene] tetraphenyl ester.

5. The composition set forth in claim 4 in which said color stabilizer is triisooctyl phosphite.

6. A resinous composition having increased color stability which comprises the polymerization product of from about 10% to about 35% by weight of acrylonitrile and from about 90% to about 65% by weight of methylstyrene, and dispersed therein from about 0.005% to about 0.3% by weight based on the weight of the monomer of the color stabilizer phosphorous acid-[2,2-bis-(phenoxyphosphinooxymethyl)trimethylene] tetraphenyl ester.

7. The composition set forth in claim 6 in which said color stabilizer is triisooctyl phosphite.

References Cited in the file of this patent

UNITED STATES PATENTS 2,878,227    Jenkins et al.    Mar. 17, 1959
2,878,229    Ucci et al.    Mar. 17, 1959